US010936560B2

(12) United States Patent
Wu et al.

(10) Patent No.: US 10,936,560 B2
(45) Date of Patent: Mar. 2, 2021

(54) METHODS AND DEVICES FOR DATA DE-DUPLICATION

(71) Applicant: EMC IP Holding Company LLC, Hopkinton, MA (US)

(72) Inventors: James Fei Wu, Beijing (CN); Colin Zou, Santa Clara, CA (US); Lin Xiao, Beijing (CN); Sean Cheng Ye, Beijing (CN); Peng Wu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 453 days.

(21) Appl. No.: 15/846,370

(22) Filed: Dec. 19, 2017

(65) Prior Publication Data
US 2018/0173732 A1  Jun. 21, 2018

(30) Foreign Application Priority Data
Dec. 21, 2016 (CN) .......................... 201611193455.5

(51) Int. Cl.
G06F 16/215 (2019.01)
G06F 16/23 (2019.01)
G06F 16/174 (2019.01)
G06F 11/14 (2006.01)

(52) U.S. Cl.
CPC ........ G06F 16/215 (2019.01); G06F 11/1453 (2013.01); G06F 11/1464 (2013.01); G06F 16/1748 (2019.01); G06F 16/2365 (2019.01)

(58) Field of Classification Search
CPC ............. G06F 16/1748; G06F 16/1752; G06F 16/2365; G06F 16/137; G06F 16/27

USPC ........ 707/692, 652, 654, 660, 690, 693, 737
See application file for complete search history.

(56) References Cited

U.S. PATENT DOCUMENTS 8,180,740 B1 * 5/2012 Stager ................. G06F 16/1752
707/692
8,311,964 B1 * 11/2012 Efstathopoulos ..... G06F 3/0608
706/45
8,370,305 B2 2/2013 Petrocelli
(Continued)

FOREIGN PATENT DOCUMENTS

CN  101479944  7/2009
CN  102346695  2/2012
(Continued)

Primary Examiner — Dangelino N Gortayo
(74) Attorney, Agent, or Firm — BainwoodHuang

(57) ABSTRACT

Embodiments of the present disclosure disclose methods and devices of data de-duplication. The method of data de-duplication performed at a client comprises: in response to receiving data to be backed up at a client, sampling the data to be backed up to obtain the sampled data; generating a signature for the sampled data; transmitting the signature to a master storage node in a storage cluster including a plurality of storage nodes, to allow the master storage node to select one storage node from the plurality of storage nodes; receiving an indication of the selected storage node from the master storage node; and transmitting, based on the indication, the data to be backed up to the selected storage node. Embodiments of the present disclosure also provide methods of data de-duplication performed at the master storage node and the slave storage node, and corresponding devices.

20 Claims, 12 Drawing Sheets

(56) References Cited

U.S. PATENT DOCUMENTS

| | | | |
|---|---|---|---|
| 8,392,384 B1* | 3/2013 | Wu | G06F 16/1748 |
| | | | 707/693 |
| 8,452,739 B2 | 5/2013 | Jain et al. | |
| 8,650,162 B1* | 2/2014 | Vaikar | G06F 11/1451 |
| | | | 707/692 |
| 8,898,120 B1* | 11/2014 | Efstathopoulos | G06F 16/11 |
| | | | 707/692 |
| 8,930,648 B1 | 1/2015 | Storer et al. | |
| 9,152,333 B1* | 10/2015 | Johnston | G06F 3/0641 |
| 9,619,479 B1* | 4/2017 | Zhang | G06F 16/1748 |
| 2007/0255758 A1* | 11/2007 | Zheng | H03M 7/00 |
| 2010/0161565 A1 | 6/2010 | Lee et al. | |
| 2012/0030477 A1* | 2/2012 | Lu | G06F 11/1453 |
| | | | 713/189 |
| 2012/0209814 A1* | 8/2012 | Zhang | G06F 11/1458 |
| | | | 707/654 |
| 2013/0042083 A1* | 2/2013 | Mutalik | G06F 16/185 |
| | | | 711/162 |
| 2014/0351214 A1* | 11/2014 | Abercrombie | G06F 16/137 |
| | | | 707/626 |
| 2016/0110260 A1* | 4/2016 | Chandrasekharan | |
| | | | G06F 11/1453 |
| | | | 707/652 |

FOREIGN PATENT DOCUMENTS

| | | |
|---|---|---|
| CN | 102598020 | 7/2012 |
| CN | 102609442 | 7/2012 |
| CN | 103870514 | 6/2014 |
| CN | 105487818 | 4/2016 |

\* cited by examiner

METHODS AND DEVICES FOR DATA DE-DUPLICATION

RELATED APPLICATIONS

This application claim priority from Chinese Patent Application Number CN201611193455.5, filed on Dec. 21, 2016 at the State Intellectual Property Office, China, titled "METHODS AND DEVICES FOR DATA DE-DUPLICATION" the contents of which is herein incorporated by reference in its entirety.

FIELD

Embodiments of the present disclosure generally relate to data processing method and device, and more specifically, to methods and devices for de-duplicating redundant data in the storage system.

BACKGROUND

In a data storage system, especially in backup and archive storage systems, the redundancy rate of the data is usually high. However, changes in the stored data may be small during a given period. For example, in an application scenario of a virtual machine, the data center has thousands of virtual machine applications and the demand for storage space is huge, but the change in each virtual machine per day is usually small, such as 50 MB data change every day. Accordingly, it is required to improve storage space utilization and optimize storage in such storage system, so as to reduce space occupied by data on the disks. One of the effective solutions is to utilize de-duplication technology.

De-duplication technology is a special data compression technology based on removal of redundant data with the purpose of reducing storage capacity used in the storage system. However, in face of high-speed growth of data, the single de-duplication server can hardly satisfy the scalability requirement. Thus, scaleout storage systems and cluster storage systems emerge. That is, there is a plurality of de-duplication servers (or known as cluster nodes) in the cluster storage system. However, the traditional data de-duplication solution cannot achieve satisfactory de-duplication effects while ensuring the load balance of the entire storage system and/or minimizing the effects on the upper-layer applications.

SUMMARY

In general, the embodiments of the present disclosure provide a solution of optimizing data de-duplication processing in a cluster storage system.

In a first aspect of the present disclosure, there is provided a method of data de-duplication. The method comprises: in response to receiving data to be backed up at a client, sampling the data to be backed up to obtain the sampled data; generating a signature for the sampled data; transmitting the signature to a master storage node in a storage cluster including a plurality of storage nodes, to allow the master storage node to select one storage node from the plurality of storage nodes; receiving an indication of the selected storage node from the master storage node; and transmitting, based on the indication, the data to be backed up to the selected storage node.

In some embodiments, the plurality of storage nodes store data in segments having a fixed length, and sampling the data to be backed up comprises: segmenting, based on the fixed length, the data to be backed up to obtain a plurality of data segments; and sampling the plurality of data segments to obtain a plurality of sampled data segments.

In some embodiments, the plurality of storage nodes store data in segments having a variable length, and sampling the data to be backed up comprises once or repeatedly: randomly selecting a starting position for the sampling; identifying a predetermined number of anchor points of the data to be backed up from the starting position in a mode corresponding to the variable length; and sampling data segments immediately following the anchor points as the sampled data segments.

In some embodiments, generating the signature for the sampled data comprises digitally signing the sampled data segments to obtain fingerprints, and transmitting the signature to the master storage node comprises transmitting the fingerprints to the master storage node.

In some embodiments, sampling the data to be backed up comprises: in response that the data to be backed up has a size below a first predetermined threshold, segmenting the data to be backed up to obtain a plurality of data segments as the sampled data.

In some embodiments, generating the signature for the sampled data comprises: digitally signing the plurality of sampled data segments to obtain a plurality of fingerprints corresponding to the plurality of data segments; and determining, from the plurality of fingerprints, a first fingerprint having a predetermined value.

In some embodiments, the method further comprises: receiving, from the master storage node, an additional indication for performing additional data sampling; performing, based on the additional indication, additional sampling on the data to be backed up to obtain additional sampled data; generating an additional signature for the additional sampled data; and transmitting the additional signature to the master storage node.

In a second aspect of the present disclosure, there is provided a method of de-duplication. The method comprises: receiving, at a master storage node in a storage cluster including a plurality of storage nodes, a signature for sampled data from a client, the sampled data being obtained by the client from sampling data to be backed up; distributing the signature to at least one salve storage node except for the master storage node in the storage cluster, to allow the at least one slave storage node to determine remote matching information indicating a matching degree between the sampled data and data stored in the at least one slave storage node; determining, based on the signature, local matching information indicating a matching degree between the sampled data and data stored in the master storage node; selecting, at least in part based on the local matching information and the remote matching information fed back by the at least one slave storage node, one storage node from the plurality of storage nodes to store the data to be backed up; and transmitting a first indication of the selected target storage node to the client.

In some embodiments, distributing the signature to the at least one slave storage node comprises: in response to receiving a fingerprint of a sampled data segment from the client, distributing the fingerprint to the at least one slave storage node, the sampled data segment being obtained by segmenting and sampling the data to be backed up, and the fingerprint being obtained by digitally signing the sampled data segment.

In some embodiments, the matching degree indicates a similarity between the sampled data and data stored in one of the plurality of storage nodes, and selecting the target storage node comprises: selecting a storage node with the similarity greater than a second predetermined threshold as the target storage node.

In some embodiments, selecting the target storage node comprises: in response to receiving a first fingerprint from the client, selecting the target storage node based on the first fingerprint and the number of storage nodes in the storage cluster, the first fingerprint indicating a data segment with a fingerprint value being a predetermined value if the data to be backed up has a size below a third predetermined threshold, and the data segment being obtained by segmenting the data to be backed up.

In some embodiments, selecting the target storage node comprises: determining the target storage node based on the local matching information, the remote matching information and a backup strategy, the backup strategy including at least one of: loads of the plurality of storage nodes and capacities of the plurality of storage nodes.

In some embodiments, selecting the target storage node comprises: determining, based on the local matching information and the remote matching information, a difference of the matching degrees between different storage nodes; in response to the difference being greater than a fourth predetermined threshold, determining the target storage node based on the difference.

In some embodiments, the method further comprises: in response to the difference being equal to or less than the fourth predetermined threshold, transmitting to the client a second indication indicating to the client to provide additional sampled data of the data to be backed up.

In a third aspect of the present disclose, there is provided an electronic device. The device comprises: a processing unit; a memory coupled to the processing unit, the memory and the processing unit together configured to cause the electronic device to perform actions comprising: in response to receiving data to be backed up at a client, sampling the data to be backed up to obtain the sampled data; generating a signature for the sampled data; transmitting the signature to a master storage node in a storage cluster including a plurality of storage nodes, to allow the master storage node to select one storage node from the plurality of storage nodes; receiving an indication of the selected storage node from the master storage node; and transmitting, based on the indication, the data to be backed up to the selected storage node.

In a fourth aspect of the present disclosure, there is provided an electronic device. The device comprises: a processing unit; a memory coupled to the processing unit, the memory and the processing unit together configured to cause the electronic device to perform actions comprising: receiving, at a master storage node in a storage cluster including a plurality of storage nodes, a signature for sampled data from a client, the sampled data being obtained by the client from sampling data to be backed up; distributing the signature to at least one slave storage node except for the master storage node in the storage cluster, to allow the at least one slave storage node to determine remote matching information indicating a matching degree between the sampled data and storage data in the at least one slave storage node; determining, based on the signature, local matching information indicating a matching degree between the sampled data and data stored in the master storage node; selecting, at least in part based on the local matching information and the remote matching information fed back by the at least one slave storage node, one storage node from the plurality of storage nodes to store the data to be backed up; and transmitting a first indication of the selected target storage node to the client.

In a fifth aspect of the present disclosure, there is provided a computer program produce tangibly stored on a non-transitory computer readable medium and comprising computer readable program instructions, the computer readable program instructions, when executed on a device, causing the device to perform the method according to the first aspect and the second aspect of the present disclosure.

BRIEF DESCRIPTION OF THE DRAWINGS

Through the following detailed description with reference to the accompanying drawings, the above and other features, advantages and aspects of various embodiments of the present disclosure will become more apparent. In the drawings, same or similar reference signs indicate the same or similar elements, wherein.

DETAILED DESCRIPTION OF EMBODIMENTS

Figure 1:
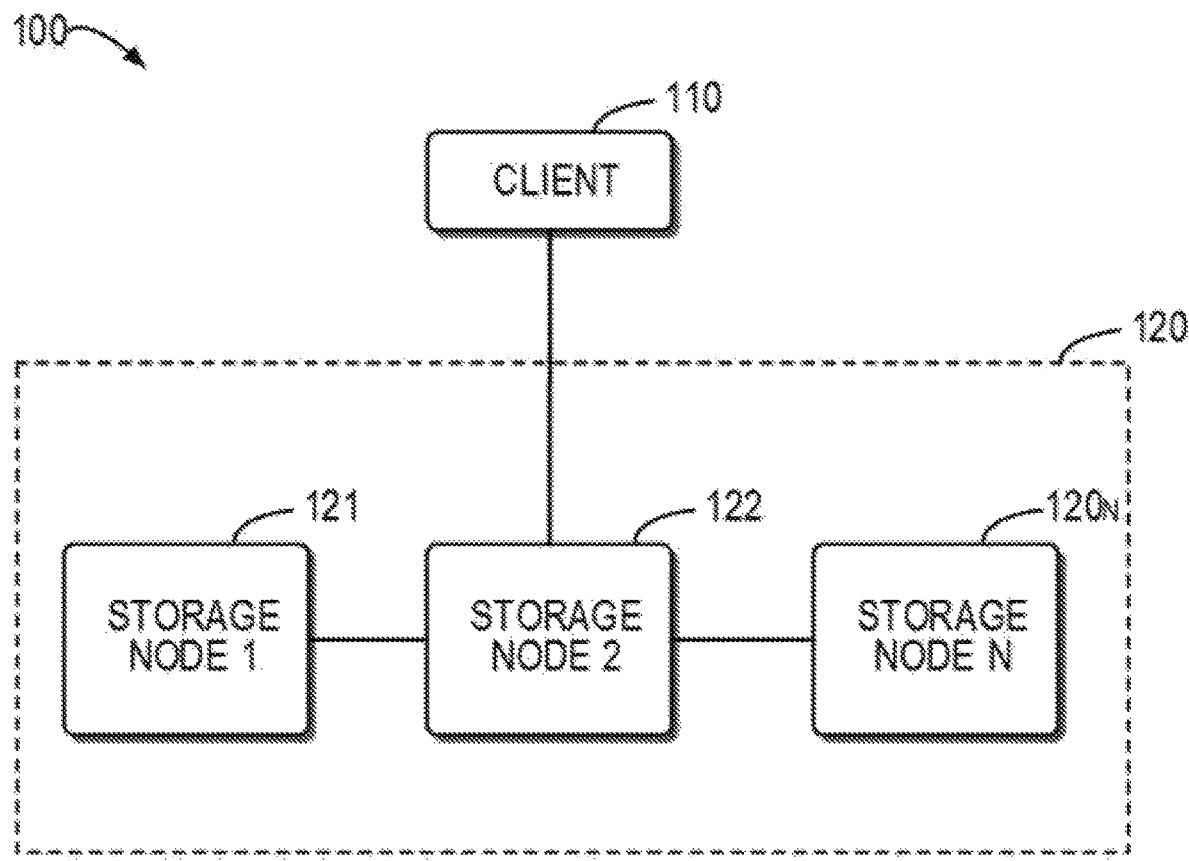
FIG. 1 illustrates an existing data processing system.

Embodiments of the present disclosure will now be described in details with reference to the drawings. It should be noted that similar components or function units in the drawings can be indicated with the same number. The attached drawings only aim to explain embodiments of the present disclosure. Those skilled in the art can acquire alternative implementations from the following description without deviating from the spirit and the protection scope of the present disclosure.

As used herein, the term "includes" and its variants are to be read as open-ended terms that mean "includes, but is not limited to." The term "based on" is to be read as "based at least in part on." The term "one embodiment" is to be read as "at least one embodiment." The term "one further embodiment" is to be read as "at least one further embodiment."

FIG. 1 illustrates an existing data processing system 100. As shown in FIG. 1, the data processing system 100 comprises a plurality of clients 110 and a storage cluster system 120. A client 110 may be any suitable electronic device having a backup need that processes backup jobs. The storage cluster system 120 comprises a plurality of storage nodes and three storage nodes as example, i.e., storage node 120₁, storage node 120₂ and storage node 1203 are illustrated in FIG. 1. The plurality of storage nodes, for example, are servers including a distributed file system, which store data and implements the above mentioned data de-duplication. The storage nodes include physical storage devices, such as Hardware Disk (HDD), Solid-State Disk (SSD), Fiber Channel (FC) disk, Serial Advanced Technology Attachment (SATA) disk, Serial Attached Small Computer System Interface (SAS) disk and the like.

The client 110 may communicate with the storage cluster system 120 via networks or in other connection manners. As an example, FIG. 1 demonstrates that a network switch 130, which is connected between the client 110 and the plurality of storage nodes, provides the client 110 with network accessing capability and network exchange functions for the storage cluster system 120, thereby implementing data transmission and data sharing.

As mentioned above, de-duplication technology can effectively enhance space utilization rate of the storage system and save disk storage capacity. When the client 110 has a need for backing up data, it may alternately or randomly select the storage nodes for backup storage, for example to "route" the data to the corresponding storage nodes. Then the storage nodes employ the de-duplication technology to de-duplicate the data and save storage space accordingly.

It will be understood that, in a cluster storage system, the storage position of data is an important indicator for measuring a storage system because the storage position of data not only involves load balancing of each storage node, but also influences the upper-layer applications to a certain extent. In the de-duplication process in the cluster storage system, the global de-duplication across nodes may severely reduce the storage performance of the system in view of the system overall function overheads. Therefore, data routing may have a considerable influence on the overall de-duplication effects for the cluster de-duplication technology based cluster storage systems.

According to embodiments of the present disclosure, in order to maintain system efficiency and ease system complexity, it is considered to perform on-line data de-duplication within one storage node. That is, the backup data (e.g., a file) is positioned in one storage node rather than being divided among various storage nodes. However, the backup data may be migrated among a plurality of storage nodes to achieve higher de-duplication rate, and a storage node is selected from the storage cluster to back up the particular data during data backup. Accordingly, the present disclosure optimizes the data routing procedure by modifying architecture and working mechanism of the data processing system 100, to enhance the overall performance of the system, and, in particular, effectively increase system de-duplication rate. The de-duplication rate is an important indicator for characterizing the performance of the storage cluster system 120 and represents the ratio of the data's size after removing redundancy to the data's original size.

Figure 2:
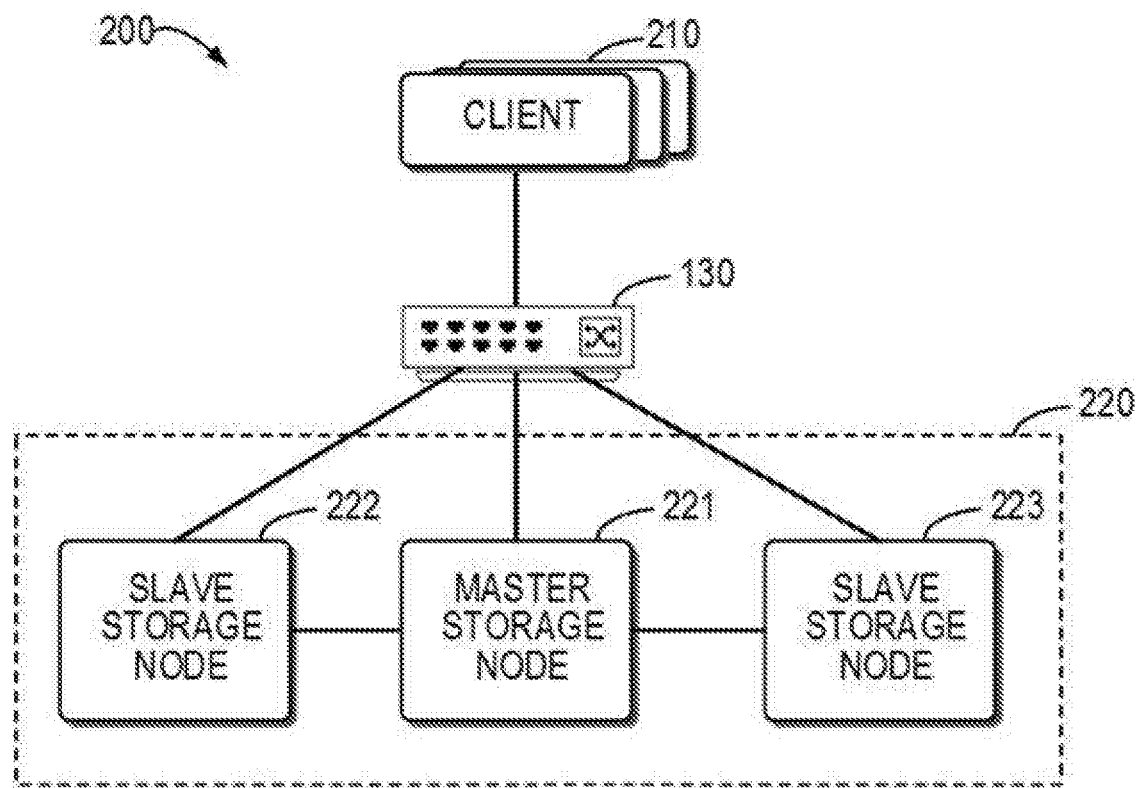
FIG. 2 illustrates a data processing system in which embodiments of the present disclosure may be applied.

FIG. 2 illustrates a data processing system 200 in which the embodiments of the present disclosure may be applied. According to an embodiment of the present disclosure, the data processing system 200 comprises a client 210 and a storage cluster system 220 consisting of a plurality of storage nodes, wherein the plurality of storage nodes is comprised of slave storage nodes and a master storage node, the slave storage nodes and the master storage node being connected with each other for communications. As an illustration, FIG. 2 demonstrates three storage nodes, i.e., a master storage node 221, a slave storage node 222 and a slave storage node 223.

In one embodiment of the present disclosure, the data stored in the storage nodes of the storage cluster system 220 is divided into data segments for example, according to a given granularity. In this embodiment, the data segments formed by dividing the data according to a given granularity are digitally signed with some digital signature algorithm, such as SHA1 algorithm, and each data segment accordingly has a corresponding hash value acting as an identifier for representing the data segment. After each data segment is digitally signed, the resultant identifier representing the data segment is referred to as "fingerprint" herein. Thus, the storage nodes save the fingerprint index of each data segment, and by querying the fingerprint index, whether the data is redundant is determined. If a new data segment is identical to the existing data in the storage cluster system 220, the new data will not be stored, and the storage position of the data will be determined by saving a pointer that points to the original data chunk.

According to the embodiments of the present disclosure, the client 210 and the master storage node 221 also communicate control information in addition to data. Meanwhile, the master storage node 221 also has interaction with the slave storage nodes regarding related information, as will be explained in details below with reference to the some embodiments. The data processing system 200 of the above architecture can support various routing strategies and deliver the data in need of backup at the client 210 to a corresponding storage node according to a given routing strategy. The routing strategy, which will be elaborated in the following, can greatly reduce processing delay and significantly improve the de-duplication rate, thereby effectively saving the storage space.

Figure 3:
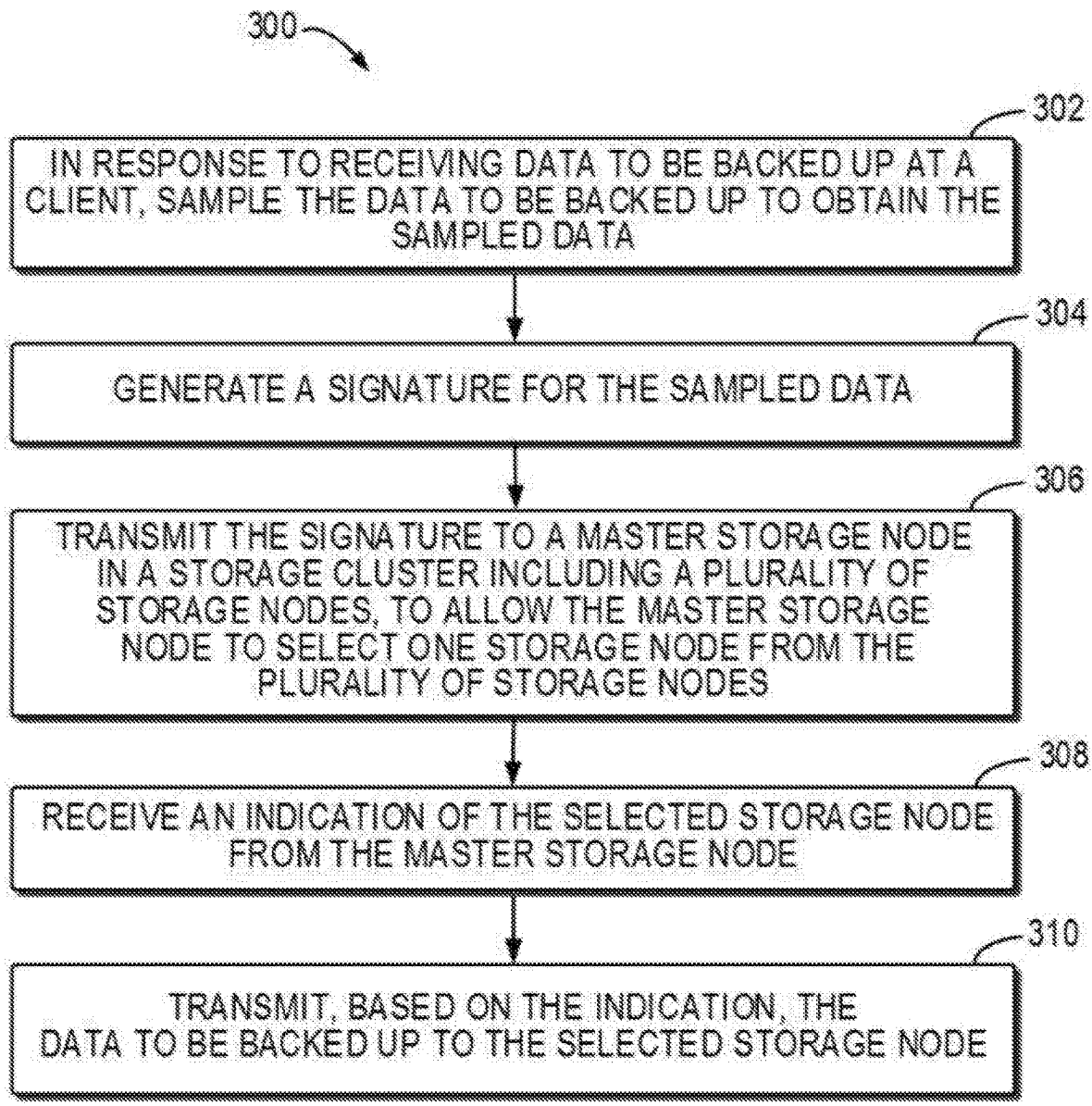
FIG. 3 illustrates a flowchart of a method implemented at a client according to one embodiment of the present disclosure.

FIG. 3 illustrates a flowchart of a method 300 implemented at the client 210 according to one embodiment of the present disclosure. At 302, in response to receiving data to be backed up at the client, the data to be backed up is sampled to obtain the sampled data. According to the embodiments of the present disclosure, the client 210 may receive the data in need of backup, such as files, mails etc. The client 210 performs a sampling process on the received data to be backed up. It will be appreciated that the client 210 may have a variety of backup application software thereon, and the data in need of backup may be provided by the backup application software, or the client 210 may, together with the backup application software, process the data in need of backup.

The client 210 may adopt different sampling strategies based on the data storage and data segmentation mode used by the storage cluster system 220. In one embodiment of the present disclosure, in the case that the data in the storage cluster system 220 is segmented with a fixed-length segmentation mode or algorithm, the client 210 uses the same fixed-length segmentation algorithm to segment and sample the data in need of backup. For example, the client 210 may segment the data in a fixed length to obtain data segments and then randomly sample a certain amount of data segments.

In a further embodiment of the present disclosure, in the case that the data in the storage cluster system 220 is segmented by a variable-length segmentation algorithm, the client 210 uses the same variable-length segmentation algorithm to segment and sample the data in need of backup. According to one example, the storage cluster system 200 segments the data by Rolling Hash algorithm. Likewise, the client 210 uses the same algorithm to segment and sample the data in need of backup. For the variable-length segmentation, the starting point of sampling will affect aligning and matching of the data segment, so it is required to identify anchor points in the data stream to be backed up during sampling. "Anchor points" or "anchors" used herein refers to points that define an area of interest for possible de-duplication in the data stream. The anchor point may be positioned by performing Rolling Hash algorithm and may also be identified using various technologies.

Specifically, a starting position for sampling can be selected randomly, for example, and the same data segments stored in the storage cluster system 220 may be obtained after identifying a given number of anchor points. The client 210 may then sample the data segments immediately following the given number of anchor points. In the same way, the client 210 may sample data segments of a plurality of data to be backed up. In particular, Table 1 shows results of multiple simulations of some data to be backed up according to the above solution.

TABLE 1

| The number of sampled data segments | Probability |
|---|---|
| 1 | |
| 2 | 0.734735 |
| 3 | 0.917918 |
| 4 | 0.976977 |
| 5 | 0.990991 |
| 6 | 0.996997 |
| 7 | 0.997998 |
| 8 | 0.998999 |
| 9 | 1 |

According to Table 1, a number of simulated de-duplication operations indicate that the probability of acquiring the same data segments stored in the storage cluster system 220 is above 99% if the segmentation has been performed more than five times from the random starting position of sampling. Therefore, in one example, the number of identified anchor points may be five for example.

Moreover, it can be understood that the sample count for sampling the data in need of backup may be a fixed number, which can be determined based on the experimental simulation results. The sampled data may also be accumulated. That is, a suitable sample count may be selected first, and then depending on the de-duplication condition of the storage nodes, it is determined whether to continually performing a number of sampling. It will be explained in details below.

In a further embodiment of the present disclosure, in the case that there is a small size of data in need of backup, for example a file having a size below a predetermined threshold (1 MB or several MB), the client 210 may directly segment the file and then perform subsequent processing on all data segments.

After the client 210 samples the data in need of backup, a signature is generated for the sampled data at 304. For example, a plurality of corresponding fingerprints may be obtained by applying the digital signature algorithm (such as SHA1 etc.) to the plurality of sampled data segments. At 306, the signature is transmitted to a master storage node in the storage cluster including a plurality of storage nodes, to allow the master storage node to select one storage node from the plurality of storage nodes. In one embodiment of the present disclosure, the client 210 may transmit fingerprints of the generated sample data segments to the master storage node 221, such that the master storage node 221 may adopt, based on the fingerprints, a decision-making strategy to select one storage node in the storage cluster system 220 as a target storage node, to which the data to be backed up will be transmitted or routed.

At 308, an indication of the selected storage node is received from the master storage node. In one embodiment, the master storage node 221 feeds back its determined target storage node to the client 210. Correspondingly, the client 210 receives the indication of the selected storage node. Afterwards, data to be backed up is transmitted to the selected target storage node based on the indication at 310. For example, the client 210 transmits the data to be backed up directly to a storage node in the storage cluster system 220 as indicated via a network switch 130.

Therefore, the client 210 routes the data to be backed up to a suitable storage node based on a routing strategy in the data processing system 200. The routing strategy, which will be further elaborated below, achieves higher data de-duplication rate, thereby saving the storage space of the storage cluster system 220.

Figure 4:
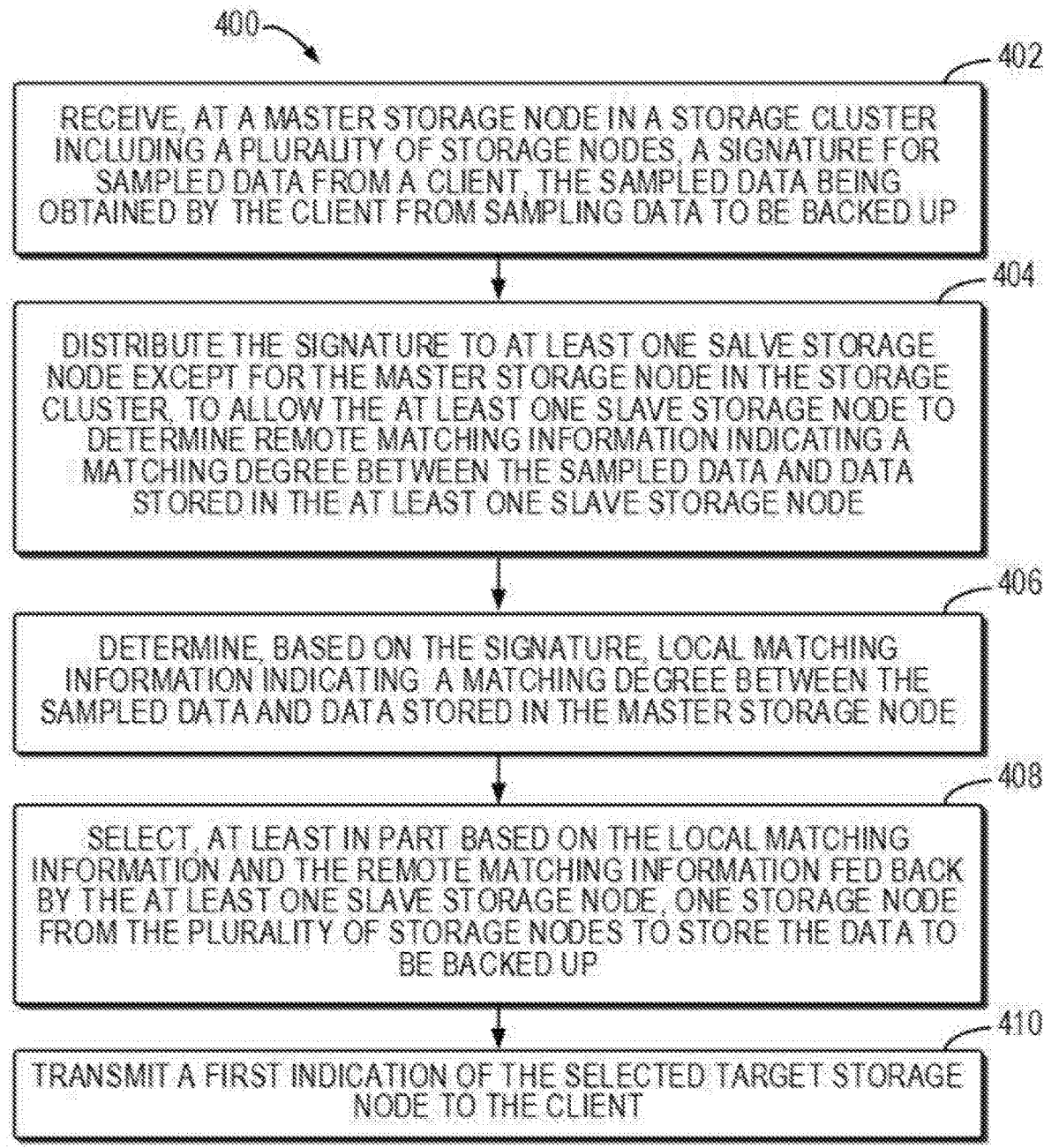
FIG. 4 illustrates a flowchart of a method implemented at a master storage node according to one embodiment of the present disclosure.

FIG. 4 illustrates a flowchart of a method 400 implemented at the master storage node 221 according to one embodiment of the present disclosure. At 402, a signature for sampled data is received from the client at the master storage node in the storage cluster including a plurality of storage nodes. The sampled data is acquired by the client from sampling the data to be backed up. In one embodiment, the master storage node 221 receives the signature of the sampled data from the client 210, and the sampled data is acquired by sampling the data in need of backup at the client 210 as described above. For example, different sampling methods are employed for the fixed-length segmentation algorithms or the variable-length segmentation algorithms to obtain a plurality of sampled data segments. Besides, the signature of the sampled data may be fingerprints of the sampled data segments.

After receiving the signature of the sampled data, the master storage node 221 distributes the signature to at least one slave storage node except for the master storage node in the storage cluster at 404, so as to allow the at least one slave storage node to determine remote matching information indicating a matching degree between the sampled data and data stored in the at least one slave storage node. For example, the master storage node 221 distributes the received signature of the sampled data to the slave storage nodes 222 and 223, such that the slave storage nodes 222 and 223 may determine matching information between the sampled data and the local storage data by lookup and matching operations. Meanwhile, the local matching information indicating the matching degree between the sampled data and data stored in the master storage node is determined based on the signature of the sampled data at 406. For example, the master storage node 221 may look up the signature (or fingerprint(s)) of the locally stored data, and further match and compare the received signature of the sampled data to obtain the corresponding matching information.

At 408, a storage node is selected, at least based on the local matching information and the remote matching information fed back by the at least one slave storage node, from the plurality of storage nodes for storing the data to be backed up. Then, a first indication of the selected target storage node is transmitted to the client at 410. In one embodiment, the matching information indicates a similarity between data stored in one of the storage nodes and the sampled data. The similarity for example may be the number of data segments having the same signature, or a score of other dimensions for characterizing the similarity.

Assuming that the number of data segments sampled (also referred to as the sample count) by the client 210 is k, each storage node in the cluster storage system 220 may receive k fingerprints via the master storage node 221. In one embodiment, in the case that the matching information indicates the number of data segments matched in each respective storage node, the master storage node 221 may select a storage node with the number of data segments matched greater than a predetermined threshold as the target storage node, for example, selecting the storage node corresponding to the maximum number of data segments matched. In this way, the routing of the data to be backed up can be simply and efficiently selected and also a better extendibility can be achieved.

Through the simulation experiments, it is found that in the case of enough samples are sampled, i.e., k is big enough, the cluster storage system 220 may get a high matching probability. By taking the two storage nodes Np and Nq as an example, it is assumed that the data to be backed up has a total number n of segments, the number of sampled data segments is k, and p and q respectively are the de-duplication rates of the data to be backed up on the storage nodes Np and Nq. That is, p*n segments may be de-duplicated on the storage node Np and q*n segments may be de-duplicated on the node Nq. The purpose is to select a node with a greater de-duplication rate. In terms of p>q, in order to select Np, it is required to satisfy the following:

One sample found on Np and zero on Nq;
Two samples found on Np and [0,1] on Nq;
k samples found on Np and [0, k−1] samples on Nq.

Figure 5:
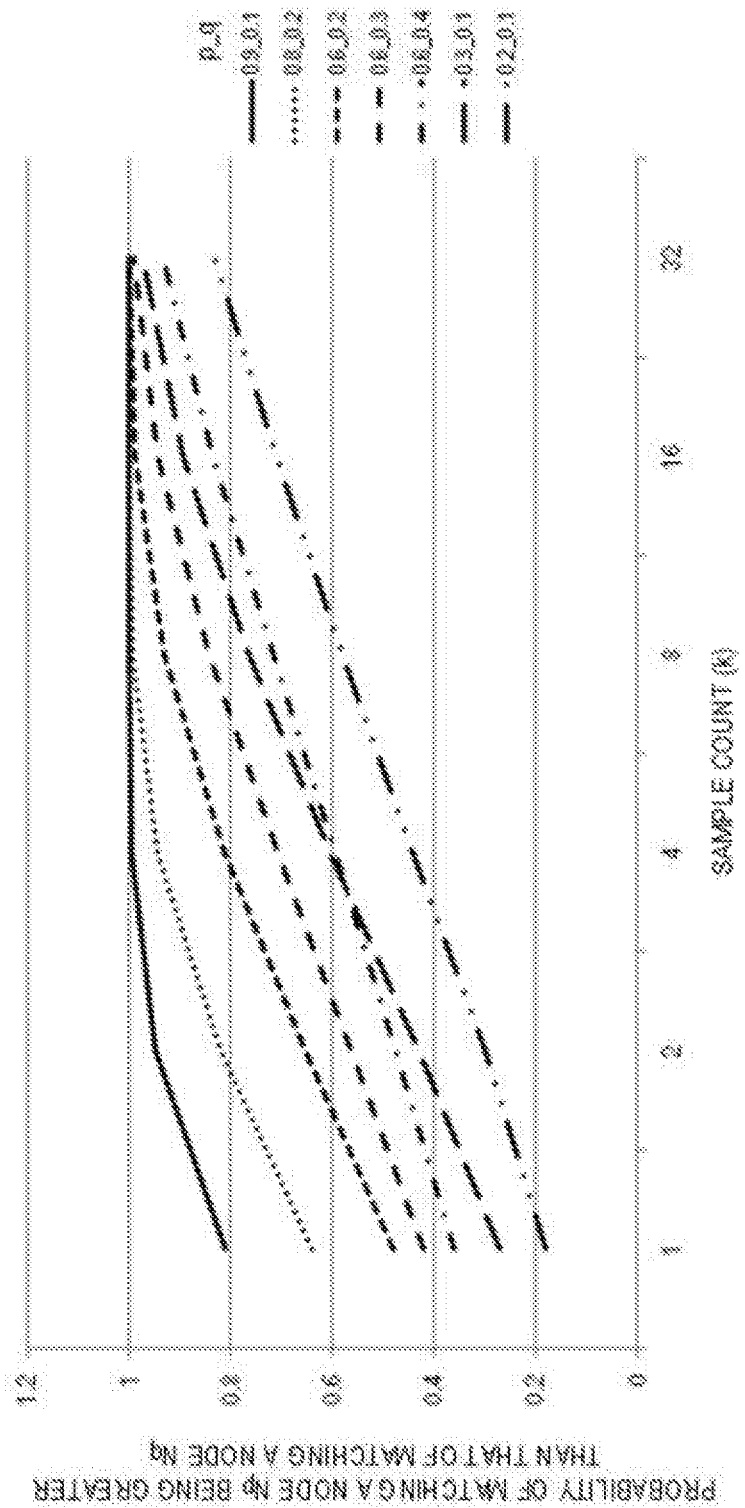
FIG. 5 illustrates a probability graph of correctly selecting a storage node plotted according to one embodiment of the present disclosure.

FIG. 5 illustrates a probability graph of correctly selecting the node Np plotted according to the above solution. According to FIG. 5, in case that p=0.9 and q=0.1 for example, one data segment is sampled and the probability of correctly selecting the node Np reaches 80%. As the sample count k increases, the probability of correctly selecting the node Np also grows. Through a number of simulation experiments, it is found (as described below with reference to Table 2) that if the sample count k reaches 150, the probability of correctly selecting the storage node having the maximum matched segments as the target node of data storage may arrive at 99%, regardless of the size of the data to be backed up. Accordingly, the client 210 may sample for example 150 data segments for the data to be backed up, and the cluster storage system 220 matches the 150 fingerprints, such that the master storage node 221 may further select the target storage node according to the maximum number of data segments matched or the highest similarity score.

Figure 6:
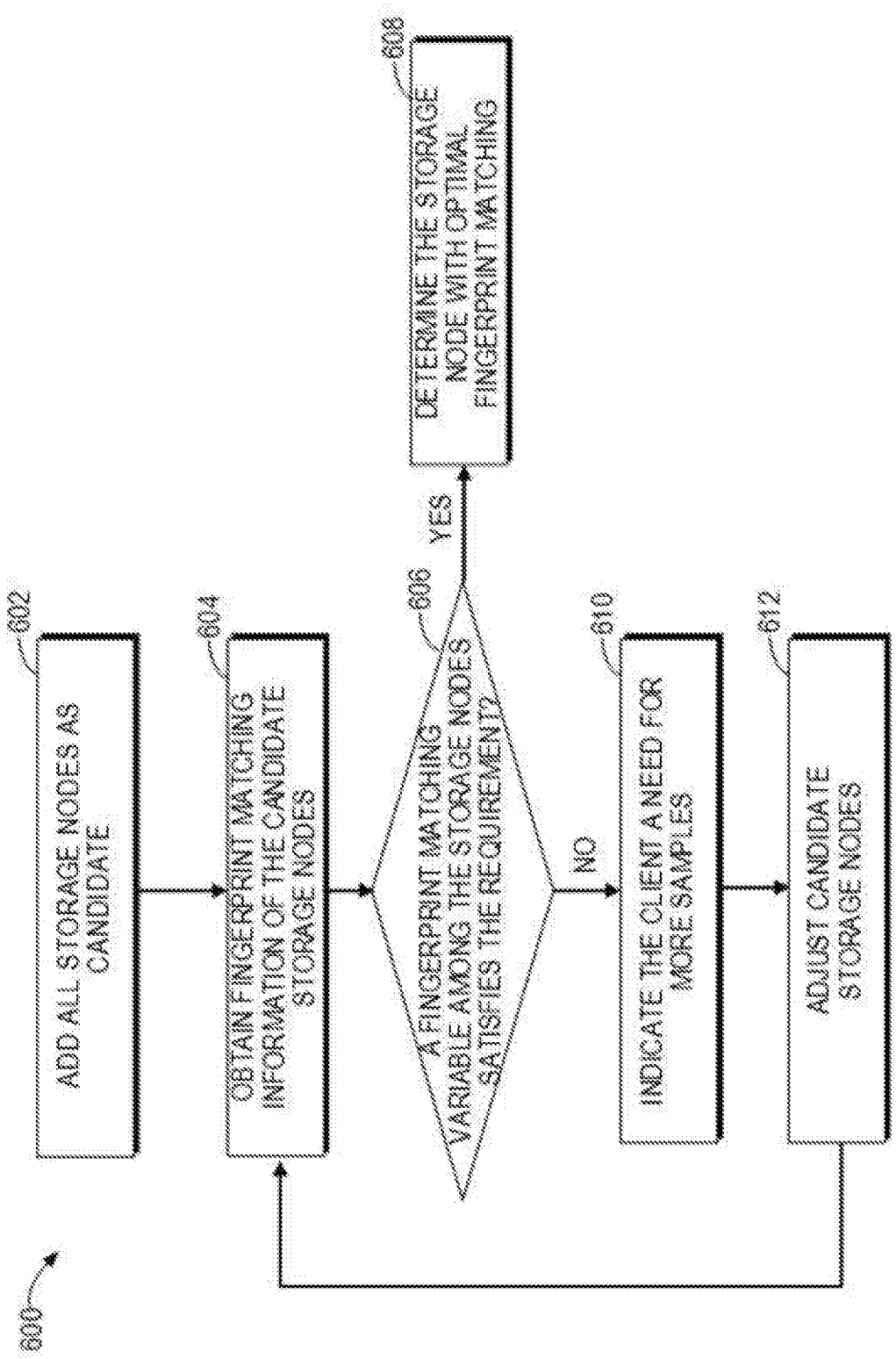
FIG. 6 illustrates a flowchart of storage node selection according to one embodiment of the present disclosure.

In a further embodiment, the target storage node is selected based on Bayesian Hypothesis Testing theory. In this embodiment, each time the client 210 needs to back up the data, it may sample in an accumulative manner based on the situation for the sake of data processing efficiency. FIG. 6 illustrates a flowchart of a procedure 600 for selecting a storage node according to one embodiment of the present disclosure. The procedure 600 is from the perspective of the master storage node 221 and may start after receiving at the master storage node 221 fingerprints of $k_i$ sampled data segments from the client 210 and delivering them to all storage nodes (i.e., 406).

At 602, the master storage node 221 may maintain a list of candidate storage nodes and add all storage nodes to the list of candidate storage nodes. At 604, the fingerprint matching information of the candidate storage nodes is acquired. For example, the master storage node 221 receives the fingerprint matching count for $k_i$ sampled data segments fed back by the salve storage nodes 222 and 223, and acquires its own fingerprint matching count so as to obtain the fingerprint matching information of all storage nodes in the list of candidate storage nodes in the cluster storage system 220. At 606, whether a fingerprint matching variable Δm among the storage nodes satisfies a requirement or not is determined. In other words, for $k_i$ sampled data segments, the differences among the matching data segment count m of the respective storage node are considered. If Δm exceeds the predetermined threshold, it is regarded as satisfying the requirement, and the storage node with optimal fingerprint matching is determined as the target storage node at 608. On the other hand, if Δm is smaller than the predetermined threshold, the master storage node 221 believes that "evidence" is insufficient and more evidence is needed to determine the target storage node. At 610, the master storage node 221 transmits to the client 210 indication information indicating the need of more information on sampled data. Afterwards, the storage nodes as candidates are adjusted at 612. For example, according to the variable Δm among the number of matched data segments of various storage nodes, the master storage node 221 may remove, according to some strategy, one or more storage nodes that certainly cannot serve as the candidate storage node.

Correspondingly, in the case that the client 210 receives an indication indicating a need of more samples, the client 210 continually samples $k_{i+1}$ data segments and transmits the corresponding $k_{i+1}$ fingerprints to the master storage node 221, so that the master storage node 221 may select the target storage node and provide feedback to the client 20. The client 210 may then route the data to be backed up. Therefore, the master storage node 221 performs the step 604 again until the target storage node is selected.

According to the above node selection solution, an appropriate sample count $k_i$ and a suitable Δm may be set to efficiently route the data. In one embodiment, Δm may be set to 9 according to the results of the simulation experiments. That is, in the case that the fingerprint matching difference between respective nodes exceeds 9 fingerprints, the master storage node 221 believes that the evidence is sufficient to determine a "correct" target storage node. Table 2 shows the sample count and the probability of acquiring Δm=9 resulted from a number of simulations for data backup according to the above solution.

TABLE 2

| Sample data segment count k | Probability of acquiring Δm = 9 |
|---|---|
| 43 | 0.5117 |
| 100 | 0.9508 |
| 120 | 0.9788 |
| 130 | 0.9861 |

TABLE 2-continued

| Sample data segment count k | Probability of acquiring Δm = 9 |
|---|---|
| 150 | 0.9941 |
| 200 | 0.9993 |

According to Table 2, in order to acquire Δm=9, it is required to have about 45 samples on average; if the sample data segments (samples) reach 150, the probability of acquiring Δm=9 may arrive at 99.41%.

Apart from the above described way of selecting the target storage node, the master storage node 221 may also adopt other routing strategies. In one embodiment, under the architecture of the data processing system 200, the master storage node 221 may also employ Round Robin algorithm to alternately select the target storage node.

In a further embodiment, as mentioned above, if the size of the file in need of backup is small, the client 210 may directly segment the file. When the master storage node 221 receives the fingerprints of all data segments, the fingerprint having a predetermined value (e.g., a minimum value) may act as an identifier of the file, and the target storage node is selected based on the identifier and the number of storage nodes in the storage cluster. For example, a modular operation is performed on the identifier and the number of storage nodes to determine the target storage node.

In another embodiment, the master storage node 221 may combine the above described solutions with other backup strategies to determine the target storage node. For example, the following may be considered: load balance of storage nodes in the storage cluster 220, capacity balance of the storage node etc.

The operations of the master storage node 221 are described above with reference to FIGS. 4-6. It can be understood that the master storage node 221 may be any storage node in the cluster storage system 220 and generated based on some election algorithm. For example, in the case that the master storage node 221 malfunctions, the cluster storage system 220 may elect another storage node, e.g., the slave storage node 223 serving as the master storage node.

Figure 7:
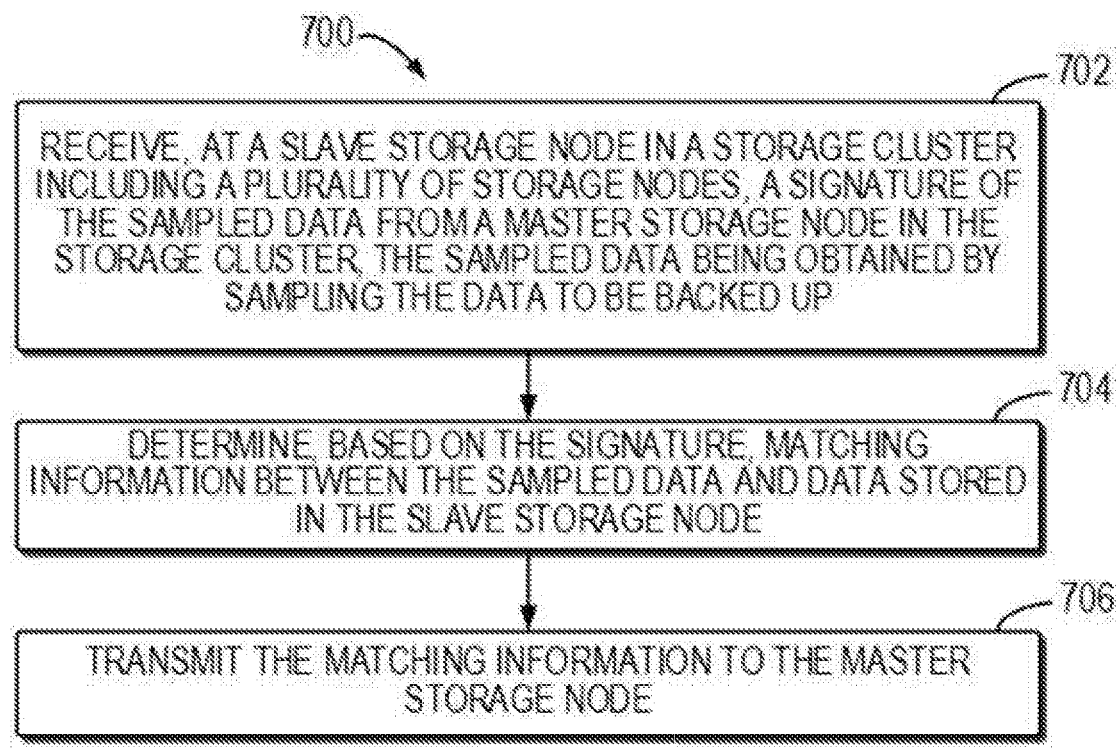
FIG. 7 illustrates a flowchart of a method implemented at a storage node according to one embodiment of the present disclosure.

FIG. 7 illustrates a flowchart of a method 700 implemented at any slave storage node (such as slave storage node 222) according to one embodiment of the present disclosure. At 702, a signature of the sampled data is received, at a slave storage node in a storage cluster consisting of a plurality of storage nodes, from the master storage node in the storage cluster. The sampled data is obtained by sampling the data to be backed up. For example, signature information from the master storage node 221 is received at the storage node 222, wherein the signature information is the digital signature of data to be stored and backed up, for example, fingerprints of the sampled data segments described above.

At 704, matching information between the sampled data and the data stored in the slave storage node is determined based on the signature. In one embodiment, after receiving fingerprints of the sampled data, the salve storage node 222 triggers a procedure of matching with the local data. For example, it may compare the received fingerprints with the fingerprints of locally stored data and determine a comparison result accordingly, such as the number of matched data segments or a similarity score etc. It can be appreciated that the local data is processed and locally stored with the same segmentation algorithm and fingerprint algorithm as stated above.

At 706, the matching information is transmitted to the master storage node. In one embodiment, the slave storage node 222 feeds back the determined matching information to the master storage node 221, to facilitate the master storage node 221 to determine a suitable routing, such that the client 210 may route the data to be backed up to an appropriate storage node and obtain a high de-duplication rate.

The methods and systems for data de-duplication proposed by the present disclosure achieve satisfactory balance in the aspect of system overheads, time delay and storage capacity, and greatly improve the de-duplication rate. In terms of system overheads, an 8 GB file is taken as an example. Assuming the average segment size is 8 KB, the system has 20 storage nodes and the file is sampled into 150 data segments. The client randomly reads I/O 150 times without optimization considerations, and each read is approximately 60 KB and the total read is 9 MB. The client needs to process about 150*40 KB=6 MB data to search the anchor point and the fingerprint lookup count is 150*20=3000 times. The fingerprint lookup count at the storage node is 8 GB/8 KB times. Accordingly, the relative overhead of fingerprint lookup is quite low and just around 3%.

With respect to time delay, assuming the data is stored on the Hard Disk Drive (HDD), the Input/Output Per Second (IOPS) of the HDD disk is 100, each sample read takes one random I/O, each fingerprint lookup takes two random I/Os, and all storage nodes perform the fingerprint lookup in parallel. Moreover, identifying of sample anchor points, fingerprint computation and network delay may be omitted. In this case, the time delay of the 150 samples is 150/100+150*2/100=4 seconds, and the time delay of the 300 samples is 8 seconds.

Figure 8:
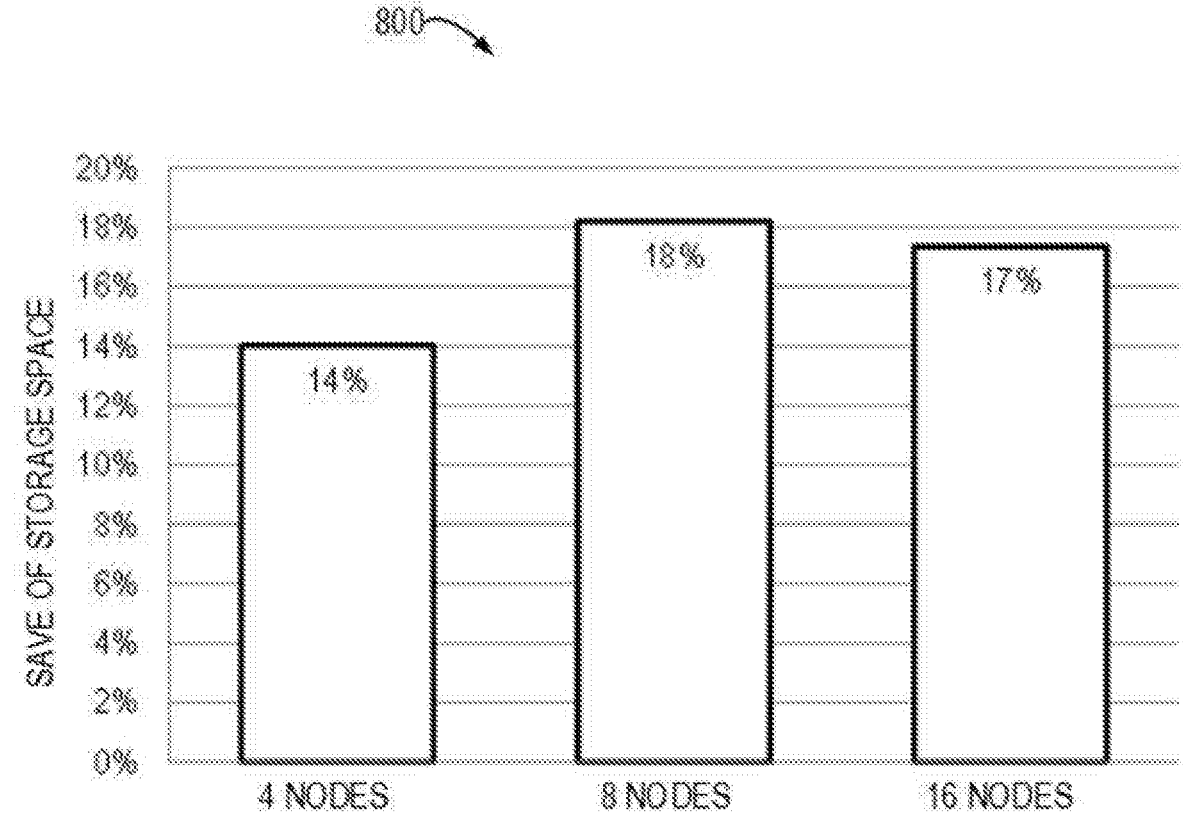
FIG. 8 illustrates a comparison of storage space saving regarding two solutions according to one embodiment of the present disclosure.

Regarding storage space, 150 fingerprints are sampled for the solution proposed by the present disclosure and the data is stored on the storage node having an optimal de-duplication rate, and then a comparison is conducted with storage capacity occupied with Round Robin algorithm for the data backup. FIG. 8 illustrates the comparison of storage space saving between the above two methods at the presence of 4, 8 and 16 storage nodes. As illustrated, 150 fingerprints are sampled and the data is stored on the storage node having an optimal de-duplication rate according to the solution proposed by the present disclosure. Compared with Round Robin algorithm, the solution proposed by the present disclosure gains 14% storage space saving in the cluster storage system having 4 storage nodes, 18% storage space saving in the cluster storage system having 8 storage nodes, and 17% storage space saving in the cluster storage system having 16 storage nodes.

Figure 9:
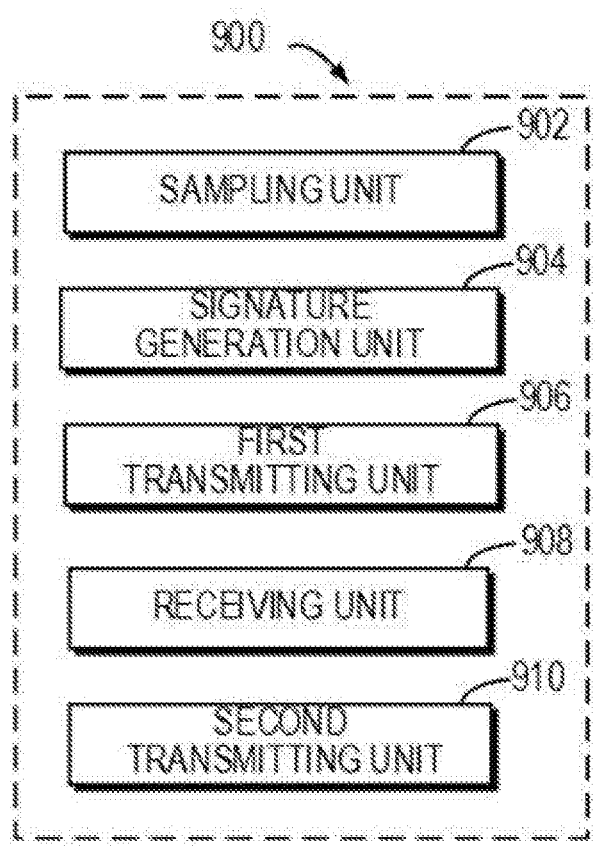
FIG. 9 illustrates a schematic block diagram of a client according to embodiments of the present disclosure.

FIG. 9 illustrates a schematic structure diagram of an apparatus 900 for data de-duplication according to embodiments of the present disclosure. In one embodiment, the apparatus 900 may be implemented as a client device (e.g., the client 210) or a part thereof. The apparatus 900 is operable to perform the method 300 described with reference to FIG. 3, the processing and the method described with reference to FIGS. 4, 6 and 7, and any other processing and methods.

To this end, the apparatus 900 comprises, a sampling unit 902 configured to in response to receiving data to be backed up at the client, sample the data to be backed up to obtain the sampled data; a signature generation unit 904 configured to generating a signature for the sampled data; a first transmitting unit 906 configured to transmit the signature to a master storage node in a storage cluster including a plurality of storage nodes, to allow the master storage node to select one storage node from the plurality of storage nodes; a receiving unit 908 configured to receive an indication of the selected storage node from the master storage node; and a second transmitting unit 910 configured to transmit, based on the indication, data to be backed up to the selected storage node.

Figure 10:
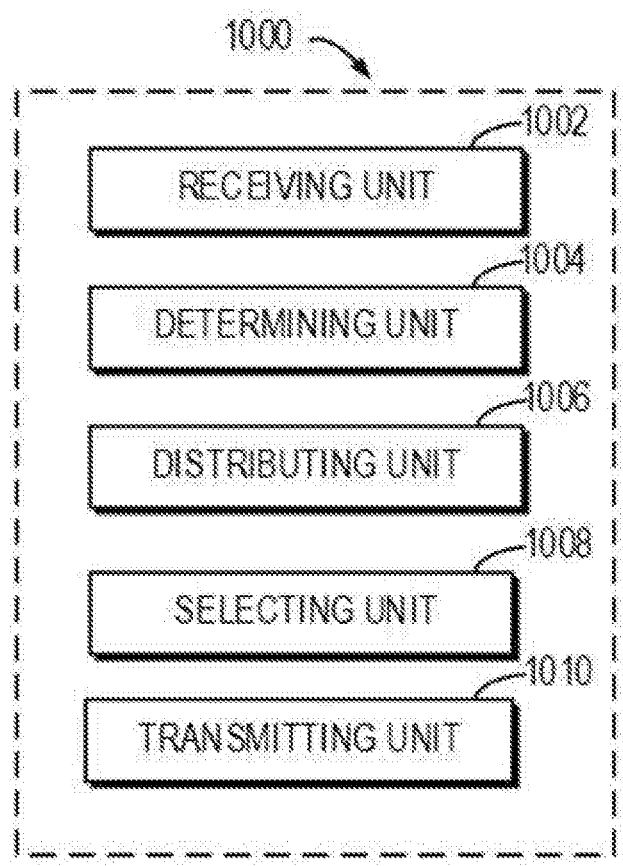
FIG. 10 illustrates a schematic block diagram of a master storage node according to embodiments of the present disclosure.

FIG. 10 illustrates a schematic structure diagram of an apparatus 1000 for data de-duplication according to embodiments of the present disclosure. In one embodiment, the apparatus 1000 may be implemented as a master storage node device (e.g., the master storage node 221) or a part thereof. The apparatus 1000 is operable to perform the method 400 described with reference to FIG. 4, the processing and the method described with reference to FIGS. 3, 6 and 7, and any other processing and methods.

Therefore, the apparatus 1000 comprises: a receiving unit 1002 configured to receive, at the master storage node in the storage cluster including a plurality of storage nodes, a signature from the client for sampled data, where the sampled data is obtained by the client from sampling the data to be backed up; a determining unit 1004 configured to determine, based on the signature, local matching information indicating a matching degree between the sampled data and data stored in the master storage node; a distributing unit 1006 configured to distribute the signature to at least one slave storage nodes except for the master storage node in the storage cluster, so as to allow the at least one slave storage node to determine remote matching information indicating a matching degree between the sampled data and data stored in the at least one slave storage node; a selecting unit 1008 configured to select, at least in part based on the local matching information and the remote matching information fed back by the at least one slave storage node, one storage node from the plurality of storage nodes for storing the data to be backed up; and a transmitting unit 1010 configured to transmit a first indication of the selected target storage node to the client.

Figure 11:
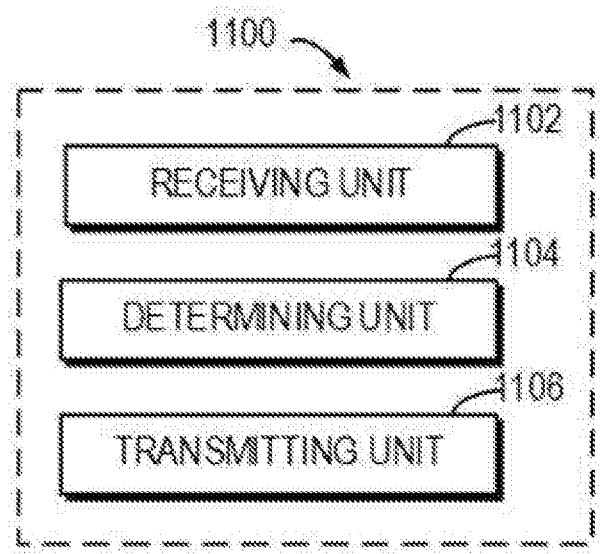
FIG. 11 illustrates a schematic block diagram of a slave storage node according to embodiments of the present disclosure.

FIG. 11 illustrates a schematic structure diagram of an apparatus 1100 for data de-duplication according to embodiments of the present disclosure. In one embodiment, the apparatus 1100 may be implemented as a slave storage node device (e.g., the slave storage node 222) or a part thereof. The apparatus 1100 is operable to perform the method 700 described with reference to FIG. 7, the processing and the method described with reference to FIGS. 3, 4 and 6, and any other processing and methods.

Accordingly, the apparatus 1100 comprises: a receiving unit 1102 configured to receive, at a slave storage node in the storage cluster including a plurality of storage nodes, a signature of sampled data from a master storage node in the storage cluster, where the sampled data is obtained by sampling the data to be backed up; a determining unit 1104 configured to determine, based on the signature, matching information between the sampled data and data stored in the slave storage node; and a transmitting unit 1106 configured to transmit the matching information to the master storage node.

It should be appreciated that each unit as recited in the apparatuses 900, 1000 and 1100 corresponds to each step in the methods and/or procedures 300, 400, 600 and 700 described with reference to FIGS. 3, 4, 6 and 7. Therefore, the above operations and features described with FIGS. 3, 4, 6 and 7 are also applicable to apparatuses 900, 1000 and 1100 and the units contained therein, and have the same effects. The details will be omitted here. Besides, the apparatuses 900, 1000 and 1100 may also comprise other optional units and/or sub-units, which are not shown for the sake of simplicity.

The units included in the apparatuses 900, 1000 and 1100 may be implemented by various manners, including software, hardware, firmware or any combinations thereof. In one embodiment, one or more units may be implemented by software and/or firmware, such as machine executable instructions stored on the storage media. Apart from the machine executable instructions or as an alternative, part or all of the units in the apparatuses 300 and 400 may be at least partially implemented by one or more hardware logic components. As an example instead of limitation, available exemplary types of hardware logic components comprise field programmable gate array (FPGA), application-specific integrated circuit (ASIC), application-specific standard product (ASSP), system-on-chip (SOP), complex programmable logic device (CPLD) and the like.

Figure 12:
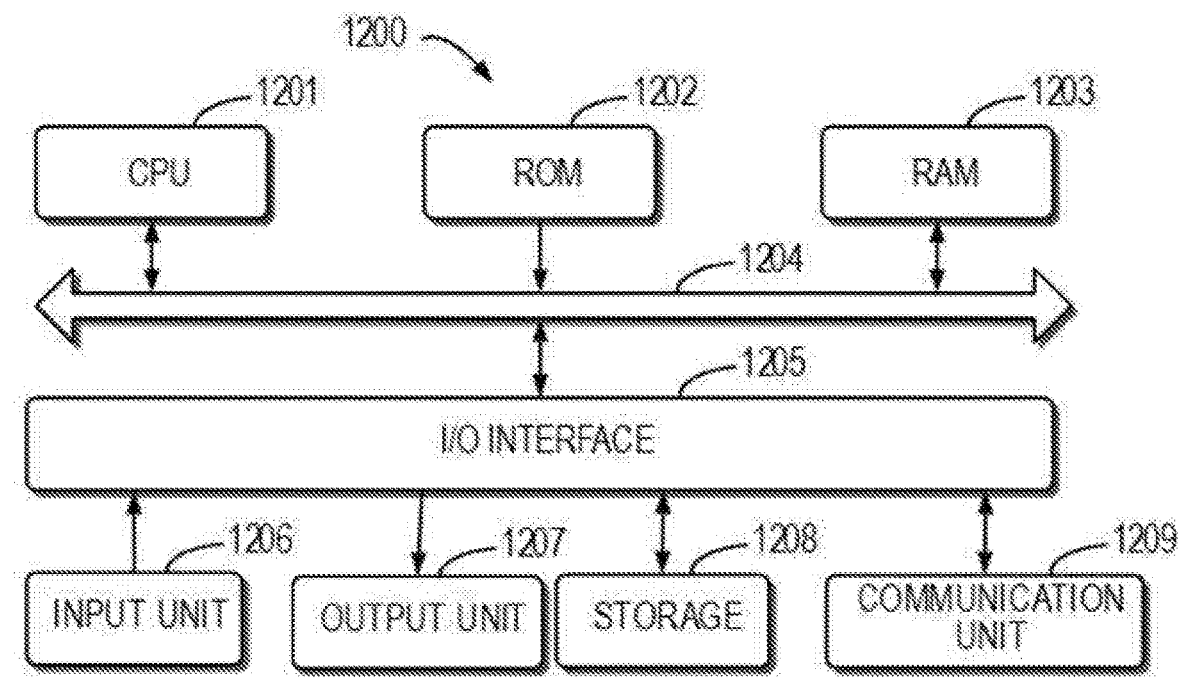
FIG. 12 is a suitability block diagram of a device according to a further embodiment of the present disclosure.

FIG. 12 illustrates a schematic diagram of a device 1200 for implementing the embodiments of the present disclosure. The device 1200 is a device for implementing data de-duplication, which comprises the above described client 210, master storage node 221 or slave storage node 222 for example. As shown, the device 1200 comprises a central processing unit (CPU) 1201, which can execute various suitable actions and processing based on computer program instructions stored in the read-only memory (ROM) 1202 or loaded into the random-access memory (RAM) 1203 from the storage unit 1208. The RAM 1203 can also store all kinds of programs and data required by operating the device 1200. CPU 1201, ROM 1202 and RAM 1203 are connected to each other via a bus 1204. The input/output (I/O) interface 1205 is also connected to the bus 1204.

A plurality of components in the device 1200 is connected to the I/O interface 1205, including: input unit 1206, such as keyboard and mouse and the like; output unit 1207, such as display and loudspeaker of various types etc.; storage unit 1208, such as disk and optical disks and so on; and communication unit 1209, such as network card, modem, radio communication transceiver etc. The communication unit 1209 allows the device 1200 to exchange information/data with other devices via computer networks, such as Internet, and/or various telecommunication networks.

In some embodiments, the processing unit 1201 can be configured to execute the above described various procedures and processing, such as methods/procedures 300, 400, 600 and 700. For example, in some embodiments, methods/procedures 300, 400, 600 and 700 can be implemented as computer software program tangibly included in the machine-readable medium, e.g., storage unit 1208. In some embodiments, the computer program is partially or fully loaded and/or installed to the device 1200 via ROM 1202 and/or communication unit 1209. When the computer program is loaded to the RAM 1203 and executed by the CPU 1201, one or more steps of the above described methods/procedures 300, 400, 600 and 700 are performed.

According to one embodiment of the present disclosure, there is provided a computer program, including computer readable program instructions for performing the methods/procedures 300, 400, 600 and 700 according to the present disclosure.

In some embodiments, the methods/procedures 300, 400, 600 and 700 of the present disclosure may be implemented as add-on software applications without modifying the current file system. Besides, they may also be implemented in the client and the cluster storage node by a modular design manner.

As an example, embodiments of the present disclosure may be described in the context of the machine-executable instructions, which are included such as in program modules executed in the means on the target real or virtual processor. In general, the program modules include routine, program, library, object, class, component, data structure and the like, which execute specific tasks or implement specific abstract data structures. In each embodiment, functions of the program modules may be combined or split in a local or distributed device. In the distributed device, the program modules may be located in the local storage medium and the remote storage medium.

The computer program codes for implementing the method of the present disclosure can be programmed using one or more programming languages. The computer program codes can be provided to a processor of a universal computer, a dedicated computer or other programmable data processing apparatuses, such that the program codes, that when executed by the computer of other programmable data processing apparatuses, cause functions/operations stipulated in the flow chart and/or block diagram to be performed. The program codes can be implemented fully on the computer, partially on the computer, as an independent software package, partially on the computer and partially on the remote computer, or completely on the remote computer or server.

Moreover, although operations are described in a particular order, it should not be appreciated that these operations are required to be performed according to this particular sequence or in succession, or a desired outcome can only be achieved by performing all shown operations. In some cases, multi-tasking or parallel processing can be beneficial. Likewise, although the above discussion includes some specific implementation details, they should be interpreted as descriptions of a particular embodiment of a particular invention rather than restrictions on scope of any invention or claims. Some features described in the context of separate embodiments in the description can also be combined to be implemented in one single embodiment. On the contrary, various features described in the context of a single embodiment can also be separately implemented in several embodiments or any suitable sub-combinations.

Through the teaching provided in the above description and the accompanying drawings, many modifications and other implementations of the present disclosure will be realized by those skilled in the art. Therefore, it should be appreciated that implementations of the present disclosure are not limited to specific implementations of the present disclosure, and modifications and other implementations are intended to be included within the scope of the present disclosure. Furthermore, although the above description and the accompanying drawings describe the example implementations in the context of some example combinations of the components and/or functions, it should be realized that alternative implementations can provide different combinations of components and/or functions without deviating from the scope of the present disclosure. In this regard, other combinations of components and/or functions different from the above description are also expected to fall within the scope of the present disclosure for instance. Although specific technical terms are employed here, they are used in general and descriptive meanings and bear no intentions of limiting the present disclosure.

We claim:

1. A method of operating a client to perform data de-duplication, the client being a computerized device having a processing unit, memory, and I/O interface connected together by a bus, and a communication unit for connecting the client to a storage cluster including a master storage node and a plurality of slave storage nodes, the method comprising:
   by the client in response to receiving data to be backed up at the client, sampling the data to be backed up to obtain sampled data and generating a signature for the sampled data;
   by the client, transmitting the signature to the master storage node, the master storage node selecting one slave storage node from the plurality of slave storage nodes and transmitting an indication of the selected slave storage node to the client, the master storage node selecting the selected slave storage node based the local matching information and remote matching information fed back by the selected slave storage node;
   by the client, receiving the indication of the selected slave storage node from the master storage node; and
   by the client, transmitting, based on the indication, the data to be backed up directly to the selected slave storage node.

2. The method of claim 1, wherein the plurality of slave storage nodes store data in segments having a fixed length, and wherein sampling the data to be backed up comprises:
   segmenting, based on the fixed length, the data to be backed up to obtain a plurality of data segments; and
   sampling the plurality of data segments to obtain a plurality of sampled data segments.

3. The method of claim 2, wherein generating the signature for the sampled data comprises digitally signing the sampled data segments to obtain fingerprints, and
   wherein transmitting the signature to the master storage node comprises transmitting the fingerprints to the master storage node.

4. The method of claim 2, further comprising:
   by the client, receiving, from the master storage node, an additional indication for performing additional data sampling;
   by the client, performing, based on the additional indication, additional sampling on the data to be backed up to obtain additional sampled data; and
   by the client, generating an additional signature for the additional sampled data, and transmitting the additional signature to the master storage node.

5. The method of claim 1, wherein the plurality of slave storage nodes store data in segments having a variable length, and wherein sampling the data to be backed up comprises once or repeatedly:
   randomly selecting a starting position for the sampling;
   identifying a predetermined number of anchor points of the data to be backed up from the starting position in a mode corresponding to the variable length; and
   sampling data segments immediately following the anchor points as the sampled data segments.

6. The method of claim 1, wherein sampling the data to be backed up comprises:
   in response that the data to be backed up has a size below a first predetermined threshold, segmenting the data to be backed up to obtain a plurality of data segments as the sampled data.

7. The method of claim 6, wherein generating the signature for the sampled data comprises:
   digitally signing the plurality of data segments to obtain a plurality of fingerprints corresponding to the plurality of data segments; and
   determining, from the plurality of fingerprints, a first fingerprint having a predetermined value.

8. A method of operating a master storage node of a storage cluster to perform data de-duplication, the master storage node being a computerized device having a processing unit, memory, and I/O interface connected together by a bus, and a communication unit for connecting the master storage node to a client and to a plurality of slave storage nodes of the storage cluster, the method comprising:
   receiving, by the master storage node, a signature for sampled data from the client, the sampled data being obtained by the client by sampling data to be backed up;
   by the master storage node, distributing the signature to at least one slave storage node of the storage cluster, to enable the at least one slave storage node to determine remote matching information indicating a matching degree between the sampled data and data stored in the at least one slave storage node;
   by the master storage node, determining, based on the signature, local matching information indicating a matching degree between the sampled data and data stored in the master storage node;
   by the master storage node, selecting, at least in part based on the local matching information and the remote matching information fed back by the at least one slave storage node, a target storage node of the cluster to store the data to be backed up; and
   by the master storage node, transmitting an indication of the selected target storage node to the client, the client transmitting, based on the indication, the data to be backed up directly to the selected target storage node.

9. The method of claim 8, wherein distributing the signature to the at least one slave storage node comprises:
   in response to receiving a fingerprint of a sampled data segment from the client, distributing the fingerprint to the at least one slave storage node, the sampled data segment being obtained by segmenting and sampling the data to be backed up, and the fingerprint being obtained by digitally signing the sampled data segment.

10. The method of claim 8, wherein the matching degree indicates a similarity between the sampled data and data stored in one of the plurality of the slave storage nodes, and wherein selecting the target storage node comprises:
   selecting a slave storage node with the similarity greater than a second predetermined threshold as the target storage node.

11. The method of claim 8, wherein selecting the target storage node comprises:
   in response to receiving a first fingerprint from the client, selecting the target storage node based on the first fingerprint and the number of storage nodes in the storage cluster, the first fingerprint indicating a data segment with a fingerprint value being a predetermined value if the data to be backed up has a size below a third predetermined threshold, and the data segment being obtained by segmenting the data to be backed up.

12. The method of claim 8, wherein selecting the target storage node comprises:
   determining the target storage node based on the local matching information, the remote matching information and a backup strategy, the backup strategy including at least one of: loads of the plurality of storage nodes and capacities of the plurality of storage nodes.

13. The method of claim 8, wherein selecting the target storage node comprises:
   determining, based on the local matching information and the remote matching information, a difference of the matching degrees between different storage nodes;
   in response to the difference being greater than a fourth predetermined threshold, determining the target storage node based on the difference.

14. The method of claim 13, further comprising:
   by the master storage node, in response to the difference being equal to or less than the fourth predetermined threshold, transmitting to the client a second indication indicating to the client to provide additional sampled data of the data to be backed up.

15. An electronic device, comprising a processing unit, memory, and I/O interface connected together by a bus, and a communication unit for connecting the electronic device to a storage cluster including a master storage node and a plurality of slave storage nodes, the memory and the processing unit together configured to cause the electronic device to perform, as a client, actions comprising:
   by the client in response to receiving data to be backed up at the client, sampling the data to be backed up to obtain sampled data, and generating a signature for the sampled data;
   by the client, transmitting the signature to the master storage node, the master storage node selecting one slave storage node from the plurality of slave storage nodes and transmitting an indication of the selected slave storage node to the client, the master storage node selecting the selected slave storage node based the local matching information and remote matching information fed back by the selected slave storage node;
   by the client, receiving the indication of the selected slave storage node from the master storage node; and
   by the client, transmitting, based on the indication, the data to be backed up directly to the selected slave storage node.

16. The device of claim 15, wherein the plurality of slave storage nodes store data in segments having a fixed length, and wherein the actions performed by the client further comprise:
   segmenting, based on the fixed length, the data to be backed up to obtain a plurality of data segments; and
   sampling the plurality of data segments to obtain a plurality of sampled data segments.

17. The device of claim 16, wherein the actions performed by the client further comprise:
   digitally signing the sampled data segments to obtain fingerprints; and
   transmitting the fingerprints to the master storage node.

18. The device of claim 15, wherein the plurality of slave storage nodes stores data in segments having a variable length, and wherein the actions performed by the client further comprise once or repeatedly:
   randomly selecting a starting position for the sampling;
   identifying a predetermined number of anchor points of the data to be backed up from the starting position in a mode corresponding to the variable length; and
   sampling data segments immediately following the anchor points as sampled data segments.

19. The device of claim 15, wherein the actions performed by the client further comprise:
   in response that the data to be backed up has a size below a first predetermined threshold, segmenting the data to be backed up to obtain a plurality of data segments as the sampled data.

20. The device of claim 19, wherein the actions performed by the client further comprise:
   digitally signing the plurality of data segments to obtain a plurality of fingerprints corresponding to the plurality of data segments; and determining, from the plurality of fingerprints, a first fingerprint having a predetermined value.

\* \* \* \* \*